United States Patent [19]

Tidwell

[11] 4,238,333
[45] Dec. 9, 1980

[54] WASTE WATER-OIL SEPARATOR

[75] Inventor: Franklin D. Tidwell, Douglasville, Ga.

[73] Assignee: Tidwell Construction Company, Douglasville, Ga.

[21] Appl. No.: 949,364

[22] Filed: Oct. 6, 1978

[51] Int. Cl.$^3$ .............................................. B03D 3/00
[52] U.S. Cl. ................................. 210/800; 210/104; 210/123; 210/138; 210/540; 210/801; 210/806
[58] Field of Search ............... 210/84, 104, 526, 540, 210/322, 138, 73 W

[56] References Cited

U.S. PATENT DOCUMENTS

| | | | |
|---|---|---|---|
| 911,314 | 2/1909 | Maranville | 210/540 X |
| 1,957,168 | 5/1934 | Hyde | 210/526 |
| 2,497,177 | 2/1950 | McClintock et al. | 210/242 S |
| 2,585,878 | 2/1952 | Tryon | 210/540 X |
| 2,661,094 | 1/1953 | Stewart | 210/540 X |
| 2,820,550 | 1/1958 | Sorg | 210/519 |
| 2,831,579 | 4/1958 | Gehle | 210/540 X |
| 3,511,383 | 5/1970 | Clyne | 210/526 |
| 3,550,783 | 12/1970 | Holloway | 210/522 |
| 3,618,772 | 11/1971 | Dietrick | 210/104 |
| 3,768,657 | 10/1973 | Hoag | 210/526 X |
| 3,884,815 | 5/1975 | Cornelissen | 210/521 |
| 3,923,659 | 12/1975 | Ullrich | 210/526 |
| 3,933,654 | 1/1976 | Middelbeek | 210/521 |
| 3,987,816 | 10/1976 | Lange | 137/563 |
| 4,042,512 | 8/1977 | McCarthy | 210/519 |
| 4,090,530 | 5/1978 | Lange | 137/563 |

Primary Examiner—John Adee
Attorney, Agent, or Firm—Sughrue, Rothwell, Mion, Zinn and Macpeak

[57] ABSTRACT

Industrial waste water, containing oil, sand and other debris, flows into the separator via a sewer line. In a first phase of operation, solids are separated by mechanical filter means, such as a bar screen, and the water is separated by permitting the oil to rise to the surface of the oil-water mixture in a large settling chamber where turbulence is reduced by various baffles. The water in the settling chamber flows through a passageway formed near the bottom of the tank by a vertical wall extending to the top of the tank. This oil-free water is continuously removed and directed to a settling pool until phase two begins. Phase two begins when the oil floating on top of the water in the settling chamber reaches a predetermined depth. The sewer and water discharge valves are closed. Liquid is then pumped into the bottom of the settling chamber to raise the liquid level in that chamber. The liquid level is slowly and continuously raised until the oil floating on the surface flows over the top of discharge weirs mounted in the top of the settling chamber. This oil is then channelled to a suitable oil storage container. When a sufficient amount of oil has been removed, phase two is terminated, and phase one is initiated. After the termination of phase two, sand and other solids which have accumulated in the bottom of the settling chamber are mechanically removed.

3 Claims, 15 Drawing Figures

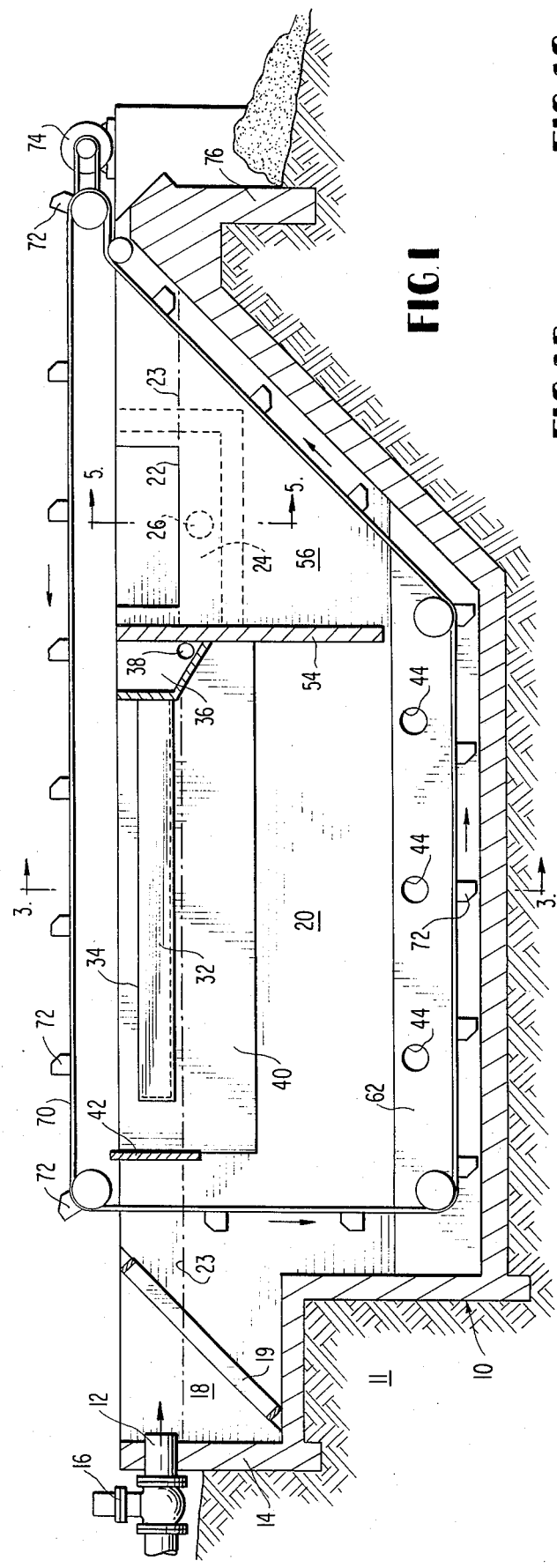
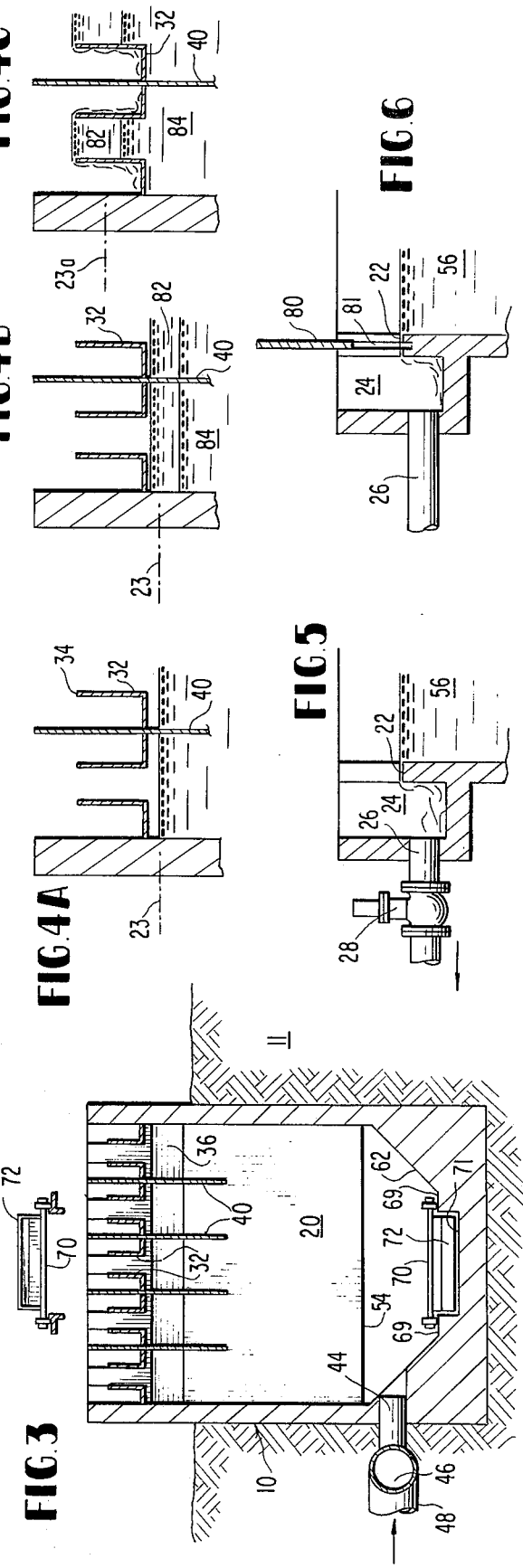

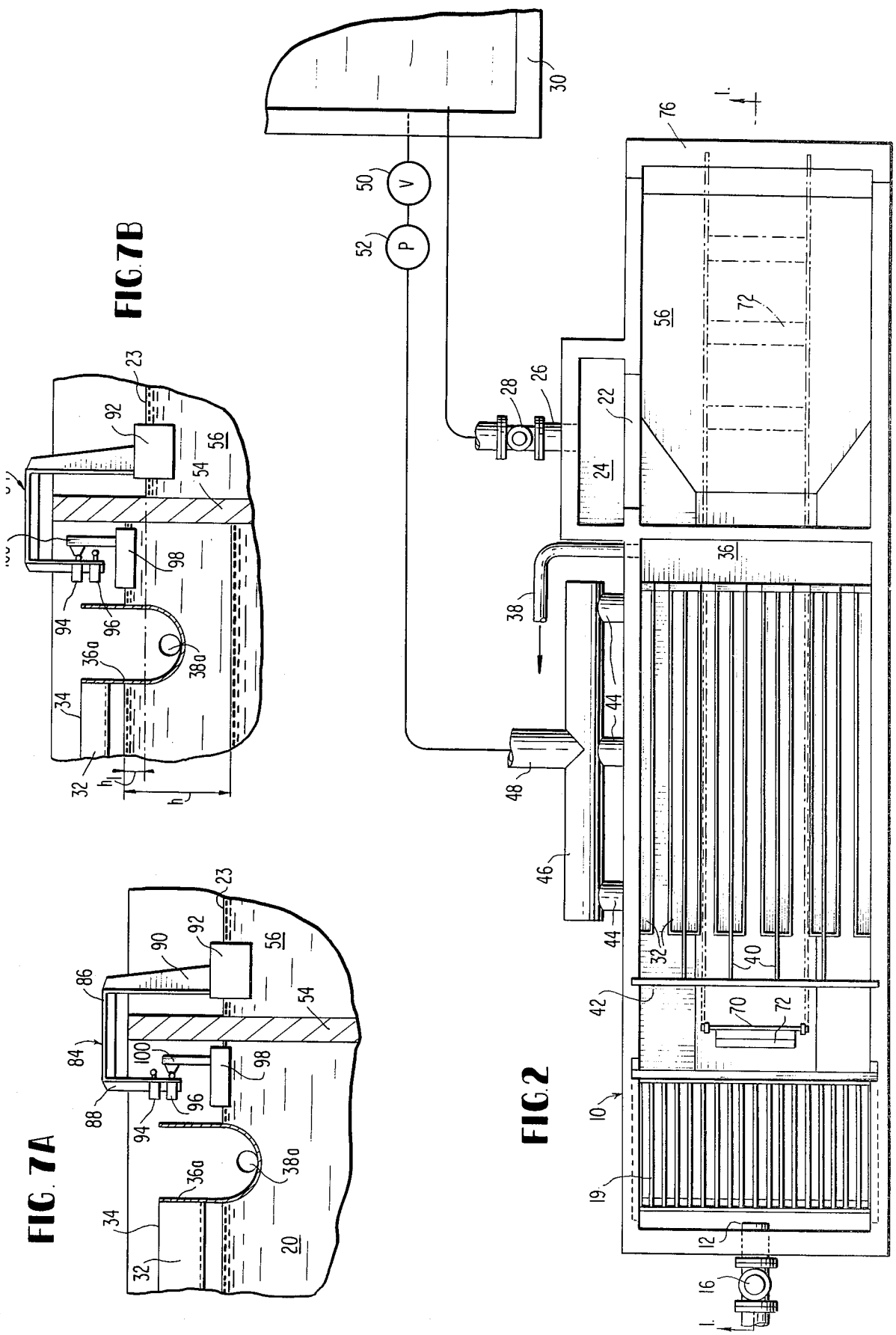

WASTE WATER-OIL SEPARATOR

BACKGROUND OF THE INVENTION

1. Field of the Invention

This invention relates generally to the field of water-oil separators and, more particularly, to an improved separator which efficiently and economically separates oil from waste water in order to render the water sufficiently pure for discharge into a sanitary sewer.

2. Description of the Prior Art

Some prior art liquid separators are disclosed in the following U.S. Pat. Nos. 911,314; 2,497,177; 2,585,878; 2,661,094; 2,820,550; 2,831,579; 3,529,728; 3,550,783; 3,884,815; 3,933,654; 3,987,816; 4,042,512, and 4,090,530.

SUMMARY OF THE INVENTION

The primary object of the invention is to provide an improved oil-water separator which is more efficient and economical than those found in the prior art.

Another object of the invention is to provide such an oil-water separator having a first operational stage wherein clean water is continually removed via a baffle wall and a first weir, and a second stage wherein the surface of the oil-water mixture is raised to the level of a second weir which is above the first weir. Between the two liquid-separation operational stages, solid waste is removed from the bottom of the separator by mechanical means.

A further object of the invention is to provide timer means and float-operated switch means for automatically controlling the liquid-separation operational stages and the removal of the solid wastes.

BRIEF DESCRIPTION OF THE DRAWING

FIG. 1 is a vertical cross-sectional view of a first embodiment of the oil-water separator, and taken along line 1—1 of FIG. 2.

FIG. 2 is a top plan view of the first embodiment of the oil-water separator of the invention.

FIG. 3 is a transverse cross-sectional view of the separator taken along line 3—3 of FIG. 1.

FIGS. 4A, 4B and 4C are enlarged fragmentary views of a portion of FIG. 3 and showing different conditions which can be encountered during the operation of the separator.

FIG. 5 is a fragmentary transverse cross-sectional view taken along line 5—5 of FIG. 1, and illustrating the weir arrangement for removal of the clear water during the operation of the separator.

FIG. 6 is a sectional view, similar to FIG. 5, showing another embodiment of the weir arrangement.

FIGS. 7A and 7B are enlarged fragmentary cross-sectional views of a portion of FIG. 1 illustrating an arrangement of float switches for permitting the automatic operation of the separator.

DETAILED DESCRIPTION OF THE PREFERRED EMBODIMENTS

Figure 8A:
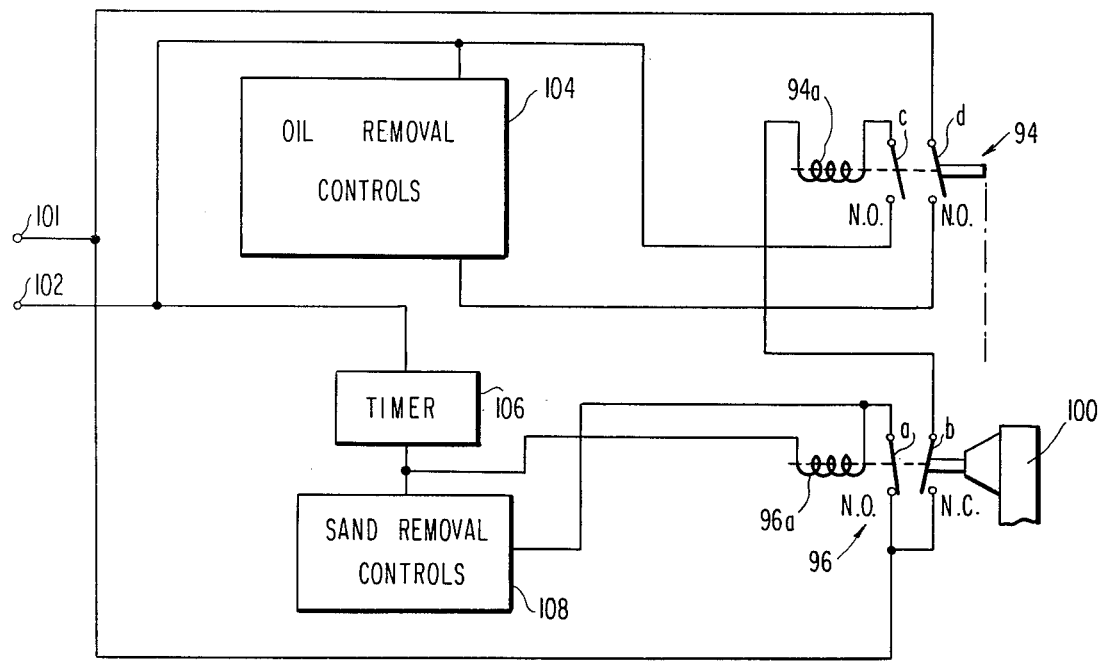
FIGS. 8A and 8B are semi-schematic diagrams of electrical circuits for operating the float switches of FIGS. 7A and 7B.

With today's increasing emphasis on environmental protection, there are very strict requirements on the quality of waste water which can be discharged into municipal sewer systems. These requirements pose a particular problem for the disposal of waste water from railroad yards, since this waste water usually contains oil, sand and other debris which must be removed before the water can be discharged into a sanitary sewer system.

FIGS. 1-5 illustrate a preferred embodiment of my improved oil-water separator which provides an efficient and economical means for separating and removing oil and solid wastes from industrial waste water. More particularly, and as shown in FIGS. 1, 2, 3 and 5, my improved oil-water separator apparatus includes a tank 10 which may be sunk in the ground 11. Industrial waste water, containing oil, sand and other debris, enters the tank via a sewer inlet pipe 12 which extends through the left-hand end wall 14. A flow control valve 16 is mounted in the sewer inlet pipe 12. Mounted in the inlet chamber 18 of the tank 10 is a bar screen 19 for separating from the water large pieces of debris which may be removed manually. The waste water then flows into the large settling chamber 20. During the first stage of operation, to be described below, the liquid level in tank 10 is determined by the height of the water discharge weir 22 in the water discharge chamber 24. This maximum liquid level height is shown by the dashed line 23. Water flowing over the weir 22 into chamber 24 is discharged via the outlet pipe 26 through a flow control valve 28 into a settling or storage pool 30.

Mounted in the upper portion of settling chamber 20 is a plurality of channel weirs 32 whose upper edges 34 are above the liquid level line 23, i.e., the height of the discharge weir 22. As will be described in more detail below, oil floating on top of the water in chamber 20 flows over the top edges of channel weirs 32 and then into the discharge trough 36 from where it flows via an oil discharge pipe 38 to a suitable oil storage container (not shown).

A baffle wall 40 projects downwardly from each channel weir 32 into the settling chamber 20 to reduce any turbulence caused by the waste water flowing into tank 10 via the sewer inlet pipe 12, thereby preventing the oil from mixing within the water in chamber 20 and permitting the oil to rise to the surface of the liquid in chamber 20. A baffle wall 42 is disposed across the top of the tank 10 between the chambers 18 and 20 thereof and extending below the liquid level line 23 also for the purpose of reducing turbulence in the chamber 20. This baffle wall 42 may be periodically removed to permit separation of any oil which may be trapped on the left-hand side of the baffle wall.

A plurality of inlet pipes 44 enter the bottom of the chamber 20 for raising the liquid level therein for the phase two operation. These inlet pipes are connected to a manifold pipe 46 which in turn is in communication with a main pipe 48 through which may be introduced liquid for raising the level in the chamber 20. As indicated in FIG. 2, the liquid may be supplied from the settling pool 30 through a suitable control valve 50 and a suitable pump 52. A baffle wall 54 extends transversely across tank 10 and divides the settling chamber 20 from the clear water chamber 56. This wall depends from the top of the tank and stops short of the bottom of the tank to provide a passageway through which clear water from the settling chamber 20 flows into the water chamber 56 for subsequent discharge through the water outlet pipe 26 in the discharge chamber 24.

As shown most clearly in the cross-sectional view of FIG. 3, the bottom of tank 10 has inclined walls 60 and 62 terminating in shoulders 64 and 66 which form a longitudinal recess 71 in the bottom of chamber 20. Such a structure forms a reduced bottom portion of the tank for accumulating sand which settles out of the liquid in chamber 20. A suitable mechanical means, such as a chain or belt conveyor 70 carrying spaced scoops or buckets 72, is employed for removing this oil-free sand from the bottom of chamber 20. The conveyor is driven by a suitable motor 74, and the sand removed by the scoops or buckets 72 travels under baffle wall 54 and upwardly through clear water chamber 56, and then is dumped over the right-hand wall 76 of the tank onto the ground.

FIG. 6 is similar to FIG. 5 except that the water discharge pipe 26 does not contain a valve 28. Instead, a vertically movable gate 80 is mounted in a slot 81 extending across the weir 22. The vertical position of the gate determines whether or not clear water flows from chamber 56 into the water discharge chamber 24.

My improved oil-water separator operates in two distinct stages. In stage one, the sewer inlet valve 16 and the clear water discharge valve 28 are open. Thus, the waste water enters chamber 18 of tank 10 and flows through the bar screen 19 which removes relatively large, solid debris from the water. The solids separated by the screen 19 are manually removed. The water then flows into the relatively large settling chamber where the lighter oil rises to the surface. Because of the relatively large size of chamber 20, the flow rate, and thus the turbulence, of the water is very much reduced, thereby preventing intermixing of the oil and water in chamber 20. The baffle walls 40 and 42 further assist to reduce currents and turbulence. In addition, the valve 16 may be partially closed to reduce flow rate to keep turbulence at a low value to permit the separation of the oil and water in the settling tank 20. The waste water continues to fill the tank, and the liquid level in the tank rises to the level of the dashed line 23 which coincides with the level of the clear water discharge weir 22. Once the water reaches this level, it flows over weir 22 into the clear water discharge chamber 24 and out pipe 26 through the open valve 28 into the settling pool 30. The baffle wall 54 functions to prevent the oil on the surface of the liquid chamber 20 from reaching the chamber 56 on the right-hand side of wall 54. The wall 54 extends downwardly from the top of the tank and stops short of the bottom wall of the tank. Hence, only the heavier water flows under the wall 54 into the chamber 56. Thus, it is seen that during phase one, clear water is continuously discharged through the pipe 26.

When it is observed that a suitable amount of oil has accumulated on the surface of the liquid in chamber 20, the phase one operation is terminated by manually closing the sewer inlet valve 16 and the clear water discharge valve 28. At this time, the conveyor 72 may be actuated to remove sand and other solid waste which has settled in the bottom of chamber 20. However, in order to minimize turbulence in chamber 20, it is preferable to actuate the conveyor after the oil has been removed from chamber 20.

Phase two is initiated by feeding liquid via the liquid inlet pipes 44 into the bottom of chamber 20 in order slowly to raise the liquid level in the chamber until the oil on the top of the liquid surface reaches the top edges 34 of the channel weirs 32, at which time the oil flows over the weirs into the channels, and then flows through the channels into the trough 36 where it is discharged via the oil discharge pipe 38 into a suitable oil storage tank or other facility. As indicated in FIG. 2, the liquid used for phase two to elevate the liquid level in chamber 20 may be provided from the clear water which was pumped into the settling pool 30 during phase one. In this case, the valve 50 is manually opened and pump 52 is actuated to feed water through the main pipe 48 into the manifold pipe 46 and thence into the liquid inlet pipes 44.

FIGS. 4A, 4B and 4C illustrate the various levels which occur in chamber 20 during the phase one and phase two operations. FIG. 4A illustrates the liquid level at the beginning of phase one, and this level is determined by the elevation of the edge of weir 22 as represented by the dashed line 23. As the oil 82 rises to the top of the water 84, the upper (oil) liquid's surface in chamber 20 rises above the level 23 of the water flowing over the weir 22.

FIG. 4C illustrates the conditions during phase two, when the inlet valve 16 and the clear water discharge valve 28 are closed, and liquid is pumped into the bottom of the chamber 20 via the liquid inlet pipes 44. The liquid in chamber 20 slowly rises until the oil 82 overflows the top edges of the weirs 32. The dashed line 23A indicates the approximate level of the clear water over the weir 22 in the clear water discharge chamber 24.

After it has been determined by observation that substantially all of the oil has been removed from the top of the liquid in chamber 20, the valve 50 is manually closed and the pump 52 deenergized to stop the flow of liquid into the bottom of chamber 20. At this time, the conveyor 70 may be activated to remove sand from the bottom of the chamber 20. The cycle is repeated, by initiating phase one by again opening the inlet valve 16 and the water discharge valve 28. As already indicated above, and as shown in FIG. 6, the clear water discharge valve 28 may be replaced by the gate or header 80.

In FIG. 7A, a slight modification of the apparatus is made in order to accommodate the float switch assembly 84. More particularly, the oil discharge trough 36a is spaced to the left away from the baffle wall 54, and an oil discharge pipe 38a carries the oil out of the trough.

The float switch assembly 84 comprises a rigid, U-shaped member 86 having a short leg 88 and a long leg 90. Fixed to the lower end of leg 90 is a float 92 which floats in the clear water in the chamber 56 on the right-hand side of the wall 54. Fixed to the lower end of the arm 88 are two microswitches 94 and 96. Switch 94 is vertically spaced above switch 96. Another float 98 floats in the liquid in chamber 20 on the left-hand side of wall 54, and carries a vertically-extending switch actuator 100. It can be seen that the position of the switch actuator 100 relative to the microswitches 94 and 96 will vary depending upon the relative heights of the floats 92 and 98, which in turn depend upon the relative heights of the liquids in chambers 56 and 20 and the relative densities of the liquids in which the floats are immersed. In effect, each float senses the level of the medium in which it floats. Suitable guide means, not shown, prevent horizontal movements of the floats 92 and 98, while permitting free vertical movement thereof.

FIG. 7A illustrates the condition that exists when essentially clear water exists in both chambers 20 and 56. In other words, the level of the liquid columns on either side of wall 54 are the same, and switch actuator 100 on float 98 actuates the lower microswitch 96. FIG. 7B illustrates the situation when a column of oil of height h floats on the surface of the water in chamber 20. In this case, float 98 rises by $h_1$ above float 92, thereby causing actuator 100 to deactuate microswitch 96 and actuate the upper microswitch 94.

Figure 8B:
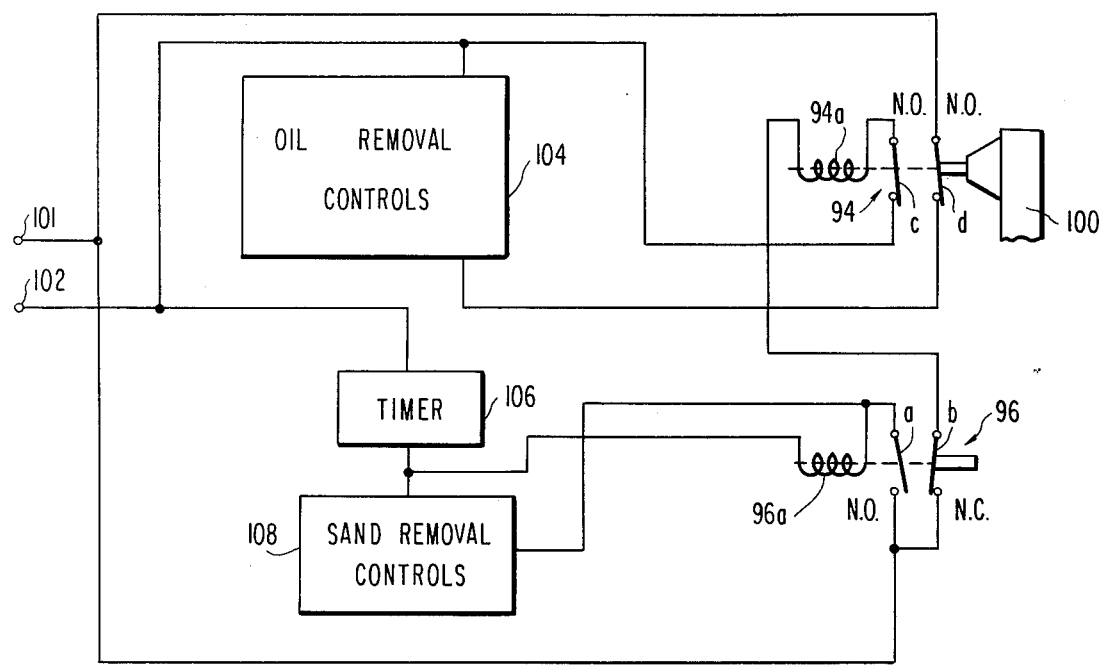

FIGS. 8A and 8B illustrate an electric circuit for automatically controlling the operation of the oil-water separator and including the microswitches 94 and 96. For automatic operation, the various valves are of the solenoid type which can be opened and closed by controlling the electric current flowing therethrough.

FIG. 8A illustrates the condition of microswitches 94 and 96 for the liquid levels illustrated in FIG. 7A. Suitable electrical power is applied across the circuit input terminals 101 and 102 which are connected through the microswitches 94 and 96 to suitable oil removal controls 104, a timer 106 and suitable sand removal controls 108. We assume that the sand removal operation has just been terminated by deactivation of the conveyor system by the timer 106. Microswitch 96 is actuated by the float actuator 100, thereby closing the normally open switch contact a and opening the normally closed switch contact b. Since microswitch 94 is not actuated, both its normally open contacts c and d are open; therefore, no current flows through the closed contact a of switch 96. FIG. 7A shows the relative liquid levels that exist at the beginning of phase one, when the sewer inlet valve 16 is opened the clear water discharge valve 28 is opened, and the inlet feed valve is closed so that no water flows into the inlets 44 at the bottom of chamber 20. As the oil begins to rise to the top of the liquid surface in chamber 20, float 98 rises relative to float 92 and moves the switch actuator 100 upwardly until the lower microswitch 96 is deactuated or released, at which time switch contacts a and b return to their normal conditions, i.e., contact a is opened, and contact b is closed. When the column of oil chamber 20 reaches such a level that actuator 100 actuates the microswitch 94, the normally opened contact c of switch 94 is closed, thereby completing a circuit through the holding coil 94a and the closed contact b, thereby locking contacts c and d of switch 94 in their closed positions. As a result of the closure of contact b, the oil removal controls 104 are energized to initiate the phase two operation of the separator, i.e., the sewer inlet valve 16 and clear water discharge valve 28 are closed, and valve 50 is closed and pump 52 energized to pump liquid into the bottom of the chamber 20 via the inlet pipes 44. This phase two condition of the microswitches 94 and 96 is illustrated in FIG. 8B.

As oil is removed from the surface of the liquid in chamber 20 by flowing over the top edges of the channel weirs 32, the height of float 98 will decrease relative to that of float 92, thereby reducing the difference in the levels between the two floats. As float 98 moves downwardly, the actuator arm 100 releases or deactivates the switch 94, but the holding coil 94a maintains the contacts c and d closed. When the switch actuator 100 finally reaches the lower microswitch 96 and actuates it, the normally closed switch contact b is opened, thereby interrupting the current path through holding coil 94a and returning switch contacts c and d to their normally open position. Consequently, the oil removal controls 104 are deenergized, thereby opening the sewer inlet valve 18 and the clear water discharge valve 28, and deenergizing the feed pump 52 and closing the valve 50. The closure of the normally open contact a activates the timer 106 and the sand removal controls 108 such that the conveyor motor 74 is operated for a predetermined time determined by the timer 106. Thus, phase one is again initiated and continues until the switch actuator again moves upwardly to actuate the microswitch 94 to terminate phase one and initiate phase two. Thus it is seen that the float switch assembly 84 automatically controls the oil-water separation by sequencing through the phase one and phase two operations depending upon the relative heights of the floats 92 and 98, which in turn depends upon the relative height of the oil column in chamber 20. The holding coil 96a is energized through the timer 106 and the closed switch contact a. Even when the float 98 moves upwardly and releases the microswitch 96, the holding coil 96a is energized, and the switch contact a maintained closed, until timer 106 times out to terminate the sand removal operation.

Figure 9:
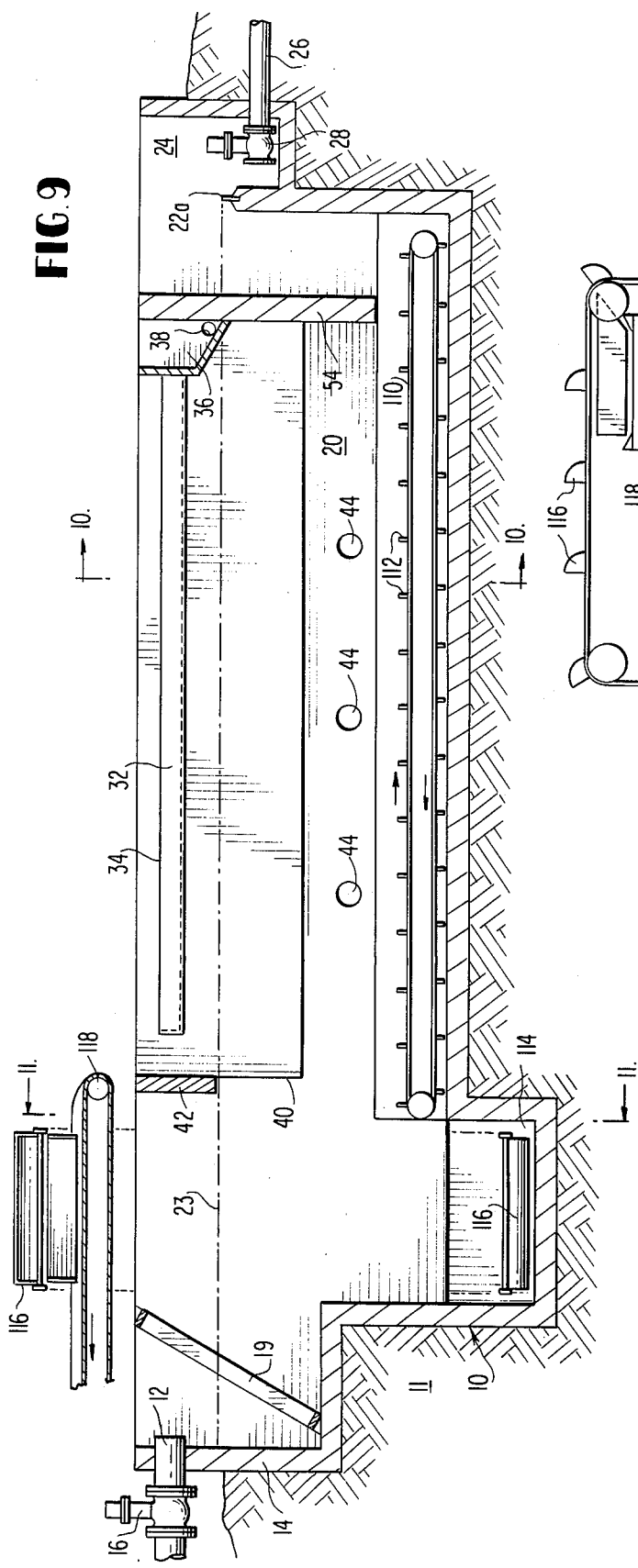
FIG. 9 is a cross-sectional view, similar to FIG. 1, illustrating a second embodiment of the separator of the invention.
Figure 11:
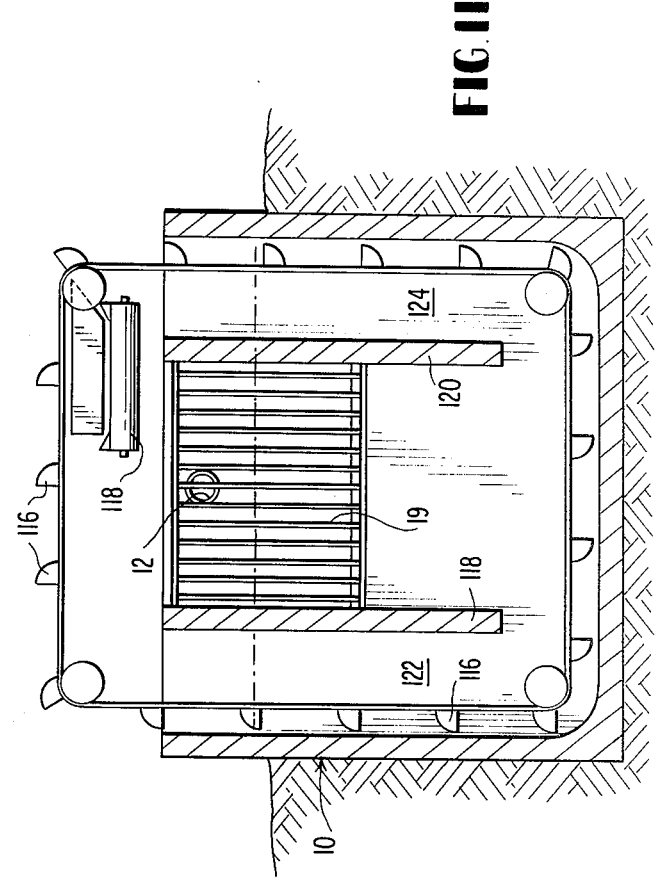
FIGS. 10 and 11 are transverse cross-sectional views taken along lines 10—10 and 11—11, respectively, of FIG. 9.
Figure 10:
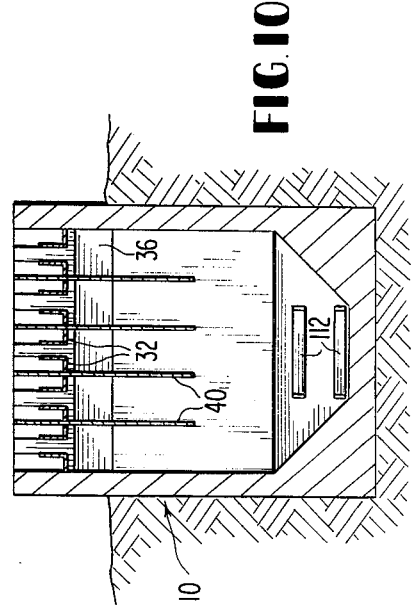

FIGS. 9, 10 and 11 illustrate a second embodiment of the invention which is quite similar in structure and identical in operation. In this second embodiment, there is a structural difference in that two sand removal conveyors are used.

More specifically, a first conveyor belt or chain 110 carries blades 112 which scrape the solid waste from the bottom of chamber 20 and move it to a lower chamber 114 on the left or input side of the tank 10. Here, a bucket conveyor 116 removes the accumulated waste material from the bottom of chamber 114 and deposits it upon a belt conveyor 118 at the top of the separator. As shown in FIG. 9, the water discharge chamber of the tank 10 may be formed as an extension of the tank rather than as an offset thereof. The weir 22a serves the same function as weir 22 in that it sets the maximum liquid level 23 during the phase one operation. Again, the clear water is discharged through pipe 26, but, in this embodiment, the discharge valve 28 is located inside of the clear water discharge chamber 24. A pair of baffle walls 118 and 120 form a pair of additional clear water chambers 122 and 124 through which the conveyor 116 passes.

I claim:
1. A method of separating oil, sand and other solid material from waste water comprising the steps of:
   A. In a first, oil-collecting, phase of operation:
      feeding the waste water into the inlet chamber of a tank also having a clear water chamber and a larger settling chamber between the inlet and clear water chambers;
      mechanically removing relatively large solid material from the waste water as it flows through the inlet chamber;
      permitting water to settle to the bottom of the settling chamber and oil to float to the top thereof;
      permitting only clear water to float under an oil barrier between the settling and clear water chambers; and
      removing via a discharge outlet in the clear water chamber the clear water flowing over a first weir means mounted in said clear water chamber at an elevation which determines the liquid level in the tank during said first phase of operation; and

B. In a second, oil-removing, phase of operation, when a predetermined height of oil is floating on the top of the liquid in the settling chamber:

terminating the feed of waste water, blocking the discharge outlet in the clear water chamber to prevent removal of the clear water flowing over the first weir means;

pumping liquid into the bottom of the settling chamber slowly to raise the liquid level therein to the top of a second weir means mounted in said settling chamber at an elevation substantially higher than that of the first weir means;

removing the oil which flows over the second weir means; and then mechanically removing from the bottom of the settling chamber sand which has accumulated there.

2. A water-oil separator apparatus comprising:

a tank having an inlet chamber, a clear water chamber, and a settling chamber disposed between said inlet and clear water chambers;

inlet means in said inlet chamber for feeding into said tank waste water containing oil, sand and other solid waste material;

controllable inlet valve means for permitting the flow of waste water through said inlet means during a first, oil-collecting, operational phase and blocking the flow of water during a second, oil-removing, operational phase;

outlet means for removing the water from said clear water chamber;

controllable outlet valve means for permitting flow of clear water through said outlet means during said first phase and for blocking the flow during said second phase;

controllable feed means for feeding liquid into the bottom of said settling chamber, only during said second phase and when an oil column of a predetermined height is floating on the surface of the liquid in said settling chamber, to elevate the level of liquid therein;

baffle wall means disposed between said settling and clear water chambers and extending from the top of said tank to a point short of the bottom of said tank to provide a lower passageway for permitting only clear water to flow under said baffle wall means into said clear water chamber;

first weir means in said clear water chamber for determining the maximum liquid level in said clear water chamber during said first phase;

second weir means mounted in said settling chamber above said first weir means for permitting flow of oil over said second weir means only during said second phase when the level of the liquid in said settling chamber has been elevated to the height of said second weir means;

means for removing the oil that flows over said second weir means during said second phase;

mechanical means mounted in said tank for removing solid waste material from the bottom of said settling chamber after the oil has been removed from the settling chamber; and float switch means responsive to the difference in liquid levels on opposite sides of said baffle wall, and coupled to said controllable inlet and outlet valve means and to said controllable feed means, for automatically initiating the phase two operation when the liquid level in said settling chamber exceeds by a predetermined height that in said clear water chamber, and for terminating the phase two operation and initiating the phase one operation when the liquid levels in said settling and clear water chambers become approximately equal because of the removal of oil from the surface of the liquid in said settling chamber.

3. The water-oil separator apparatus defined in claim 2 wherein said float switch means comprises:

a U-shaped structural member having first and second legs extending downwardly on opposite sides of said baffle wall means;

a first float fixed to the lower end of said first leg and floating in the liquid on one side of said baffle wall means;

a switch actuator fixed to the lower end of said second leg;

a second float floating in the liquid on the other side of said baffle wall;

first and second switches mounted on said second float at different elevations; and circuit control means connecting said first and second switches to said controllable inlet valve means, controllable outlet valve means and to said controllable feed means for automatically switching the operation of the separator between said first and second phases.

* * * * *